(12) United States Patent
Dufala et al.

(10) Patent No.: US 7,042,122 B1
(45) Date of Patent: May 9, 2006

(54) ELECTRIC MOTOR

(76) Inventors: James Dufala, 36269 Hedgerow Park Dr., North Ridgeville, OH (US) 44035; Ralph Thomas, 5800 Wadsworth Rd., Medina, OH (US) 44256

( * ) Notice: Subject to any disclaimer, the term of this patent is extended or adjusted under 35 U.S.C. 154(b) by 0 days.

(21) Appl. No.: 10/632,345

(22) Filed: Aug. 1, 2003

Related U.S. Application Data

(60) Provisional application No. 60/400,835, filed on Aug. 2, 2002.

(51) Int. Cl.
*H02K 11/00* (2006.01)
(52) U.S. Cl. .................. 310/68 R; 310/71; 310/179
(58) Field of Classification Search .................. 310/43, 310/68 R, 71, 179, 184, 254–259
See application file for complete search history.

(56) References Cited

U.S. PATENT DOCUMENTS 4,679,313 A * 7/1987 Schultz et al. ................ 29/596
4,968,911 A * 11/1990 Denk .......................... 310/42
5,200,661 A 4/1993 Shramo et al.
5,425,165 A 6/1995 Shramo et al.
5,619,085 A 4/1997 Shramo

* cited by examiner

Primary Examiner—Thanh Lam
(74) Attorney, Agent, or Firm—Renner, Otto, Boisselle & Sklar, LLP

(57) ABSTRACT

A simulated slot electric motor having a permanent magnet rotor, a stator, and a flexible electronic motor control package is provided. The stator is composed of a magnetic flux tube and a plurality of field windings. The magnetic flux tube includes a plurality of ribbon coil segments that provide a path for the magnetic flux, generated during motor during operation. The multiple field windings are at least partially retained within the inside diameter of the magnetic flux tube, and are configured to be arranged within the magnetic flux tube without the use of conventional slots. In one embodiment, the electronic motor control package is modular, having a modular power supply circuit and a modular commutation control circuit. Preferably, the modules are of a plug and play type. A modular electronic motor control package provides unique flexibility allowing interchangeability for the required power and performance needed for a great variety of applications.

8 Claims, 10 Drawing Sheets

120

700
SECTION A-A

ELECTRIC MOTOR

CROSS REFERENCE TO RELATED APPLICATIONS

The application claims priority to United States Provisional Patent Application entitled "Simulated Slot Electric Motor," Ser. No. 60/400,835, which is hereby incorporated by reference in its entirety.

FIELD OF THE INVENTION

The invention generally relates to electromechanical devices, such as electric motors and generators, and, more particularly, to a low loss, high power multi-phase, brushless electric motor having simulated slots.

BACKGROUND

Conventional slotted electric motors are well known and used in a variety of applications, such as power tools, consumer appliances, and automotive components industry. Some inefficiencies in slotted electric motors can be attributed to eddy current and hysteresis losses. These and other loses are usually dissipated as heat. Conventional laminations in slotted electric motors provide a convenient area to contain motor windings, however, these laminations increase eddy current and hysteresis losses.

Conventional electric motors with carriers or bobbins are commonly used to position and hold field windings. Generally, however the carriers or bobbins create inefficiencies that increase eddy current and hysteresis losses. In addition, carriers or bobbins used in this type of construction increases motor size and component cost.

Brushless electric motors are common and have been developed for use in the general manufacturing, the automotive, and the consumer industry. Typical applications include power tools, consumer appliances, machine tools, pumps, and motors used in the defense industry. Generally, however the electronic control package must be specifically designed and packaged for each brushless electric motor application in order to provide the desired performance. This type of electronic package, which is specifically tailored for each specialized design, increases manufacturing costs.

SUMMARY

A simulated slot electric motor having a permanent magnet rotor, a stator, and a flexible electronic motor control package is provided. The stator is composed of a magnetic flux tube and a plurality of field windings. The magnetic flux tube includes a plurality of ribbon coil segments that provide a path for the magnetic flux generated during motor operation. The multiple field windings are at least partially retained within the inside diameter of the magnetic flux tube, and are configured to be arranged within the magnetic flux tube without the use of conventional slots. In one embodiment, the electronic motor control package is modular, having a modular power supply circuit and a modular commutation control circuit. Preferably, the modules are of a plug and play type. A modular electronic motor control package provides unique flexibility allowing interchangeability of the modules for the required power and performance needed for a wide variety of applications.

DETAILED DESCRIPTION

The present invention relates generally to electromechanical devices, such as electric motors and generators. One embodiment relates to a low-loss, simulated-slot, high-power, balanced, multi-phase, brushless, electric motor having simulated slots forming a plurality of arc ring sectors at least partially contained within a segmented magnetic flux tube.

Figure 1:
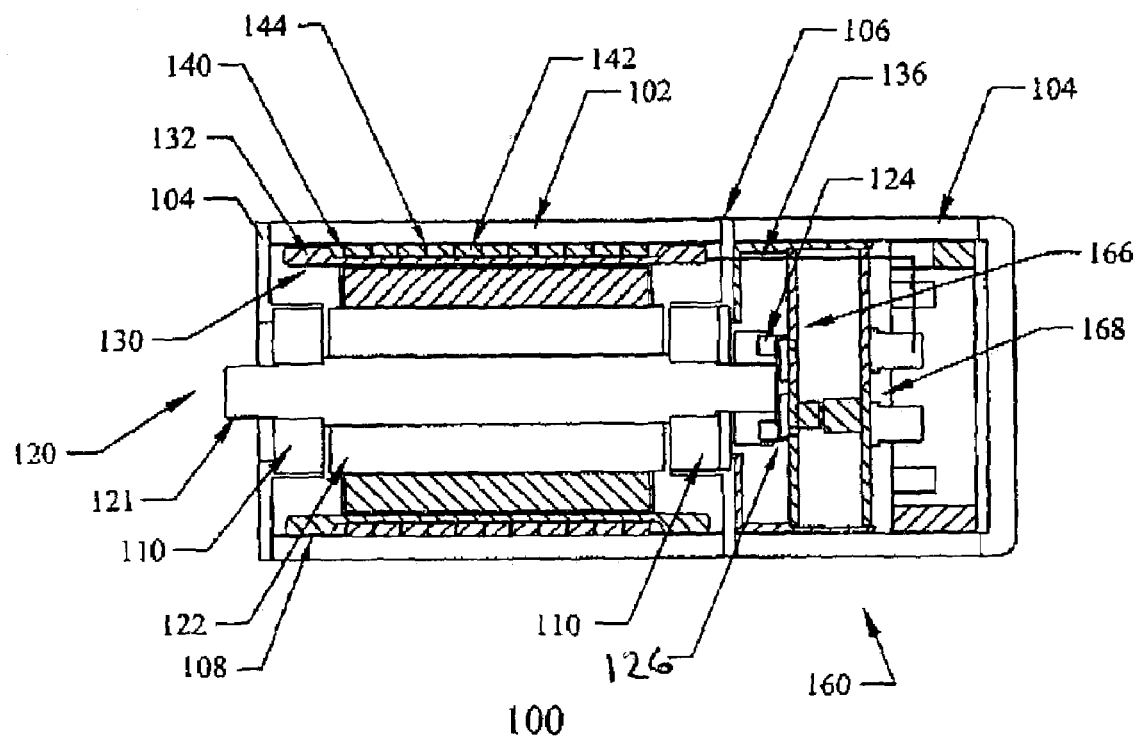
FIG. 1 illustrates a cross-sectional view of one embodiment of a simulated slot, multi-phase, brushless electric motor.

FIG. 1 illustrates an embodiment of a simulated slot electric motor 100. The simulated slot electric motor 100 includes a housing 102, a stator 130, a rotor 120, and an interchangeable flexible electronic modular control package 160. The electronic modular control package 160 provides the power control package 168 and commutation control package 166. The components of the modular control package 160 are interchangeable and flexible, and will be discussed in more detail below. Preferably the housing 102 is made of a thermal conductive material, such as aluminum, and has a finned outer form to dissipate heat. In addition, the housing 102 has an internally cylindrical shape and includes a first end cap 104 and a second end cap 106. The end caps 104 and 106 can be made of any material, but preferably are made of non-thermal conductive material. A non-thermal conductive material prevents heat from transferring from the motor housing 102 to the bearings 110. The life of the bearings 110 and the efficiency of the motor 100 are increased by preventing heat from reaching the bearings 110. The end caps 104, 106, respectively, seal the ends of the housing 102, and provide a support for bearings 110. In turn, the bearings 110 support the rotor 120 and allow the rotor 120 to freely rotate within the stator 130. The bearing 110 can be any conventional type of bearing. In one embodiment, the bearings 110 are air bearings, which allow the motor 100 to reach speeds of approximately 70,000 RPMs.

The rotor can be any type of rotor for use in electric motors. Preferably, however, the rotor is a conventional permanent magnet rotor 120 that includes a plurality of permanent magnets 122 having north and south poles secured to the rotor shaft 121. Using a rotor having permanent magnets eliminates the need for brushes that are often used to transfer electrical current to motor rotors that do not have permanent magnets. Eliminating the brushes simplifies the motor design and reduces manufacturing costs. In addition, eliminating the brushes eliminates sparks that occur between the brushes and the rotor, which allows the motor to be used in a wide range of environments. Preferably the control circuitry for the simulated slot electric motor 100 includes a means for determining the position of the rotor 120 in relation to the position of the stator 130, which is described in more detail below.

The stator 130 includes a plurality of field windings 132 and a magnetic flux tube 140. The magnetic flux tube 140 includes a plurality of ribbon coil segments 142 separated by a plurality of insulation separators 144. The coil of segments 142 are formed with thin narrow strips of a magnetic flux conductive material. Preferably, the magnetic flux conductive material is 3% silicon electric steel. In the alternative, other magnetic flux conductive material, such as silicon carbon, iron with 50% cobalt can be used. The thin strips of conductive material are wrapped around an inner insulation tube 146 to form a generally cylindrical or tubular shape and bound together with the insulation separator 144. The coil segments 142 and the formation of a magnetic flux tube 140 will be described in more detail below. The plurality of coil segments 142 bound together generally form the magnetic flux tube 140. In addition, the inner insulation tube 146 is bonded to the magnetic flux tube 140 and provides an insulation barrier between the field windings 132 and the magnetic flux tube 140.

Figure 3A:
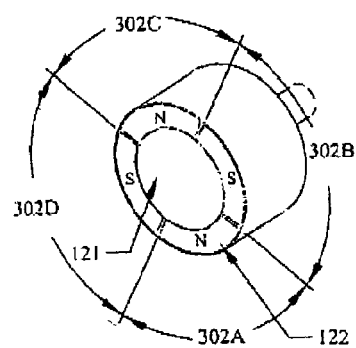
FIG. 3A illustrates a cross-section view of one embodiment of a permanent magnet rotor.
Figure 3B:
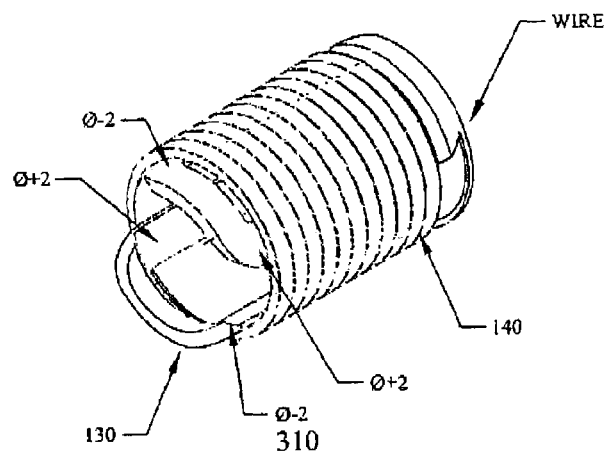
FIG. 3B illustrates a perspective view of one embodiment of a stator having a magnetic flux tube and field windings formed around simulated slots.
Figure 3C:
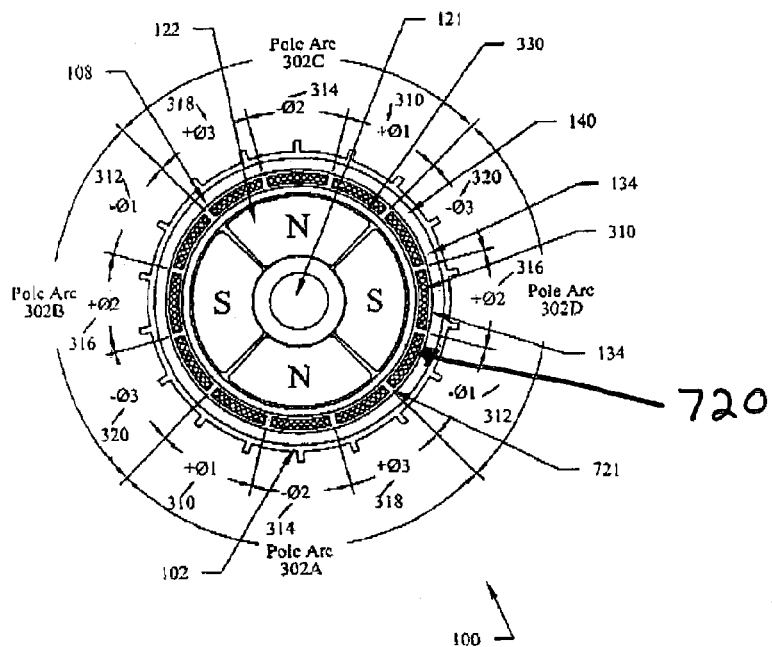
FIG. 3C illustrates a cross-sectional view of the permanent magnet rotor of FIG. 3A and the stator of FIG. 3B.

The power and efficiency of a motor is enhanced by limiting losses, such as those caused by the slots within magnetic flux cores of conventional motors. In one embodiment, the field windings 132 are formed in a unique way, with unique tooling arrangement discussed in more detail below. The simulated slot electric motor 100 can be configured to have a small air gap or large air gap between the field windings and the rotor 120. In general, the field windings 132 can be connected in any known configuration, such as when configuration or delta configuration. Preferably, the ends 136 of the filed windings 132 exit through end cap 106 and are connected to the interchangeable flexible electronic modular control package 160, discussed in more detail below. The plurality of field windings 132 are disposed along the generatrix of the magnetic flux tube 140 and secured to the inner insulation tube 146. Each positive and negative phase of each field winding is contained in a simulated slot; the slots are provided and defined schematically as shown in FIG. 3C at reference number 720, and are separated by a gap generally referenced at number 721. Positioning the field windings 132 on the inner insulation tube 146 of the magnetic flux tube 140 within simulated slots greatly reduces losses caused by conventional slots within the magnetic flux cores. In addition, the configuration of the magnetic flux tube 140 with the plurality of insulation separators 144 separating the coil segments 142 contains the magnetic flux leakage and further enhances the power and efficiency of the motor 100. Each coil segment 142 separately helps to contain the magnetic flux leakage.

The current in the plurality of field windings 132 creates a rotating magnetic flux. Without the use of conventional slots, the rotating magnetic flux exhibits very low eddy current and hysteresis losses. The method of combining a plurality of field windings 132 within a magnetic flux tube 140 without the use of slots, such as in a conventional motor, allows for a wide variety of simple designs. A simple design change enables a simulated slot electric motor having a magnetic flux tube 140 and a plurality of field windings 132 to conform to many diverse applications. For example, increasing or decreasing the number of individual windings within the field windings 132 affects motor torque. Further, increasing or decreasing the size of the air gap between the rotor 121 and field windings 132 affect the motor torque. Varying the length of magnetic wire making up the field windings 132 within the simulated slot 134 allows a defined current to produce a desired motor torque.

Figure 2:
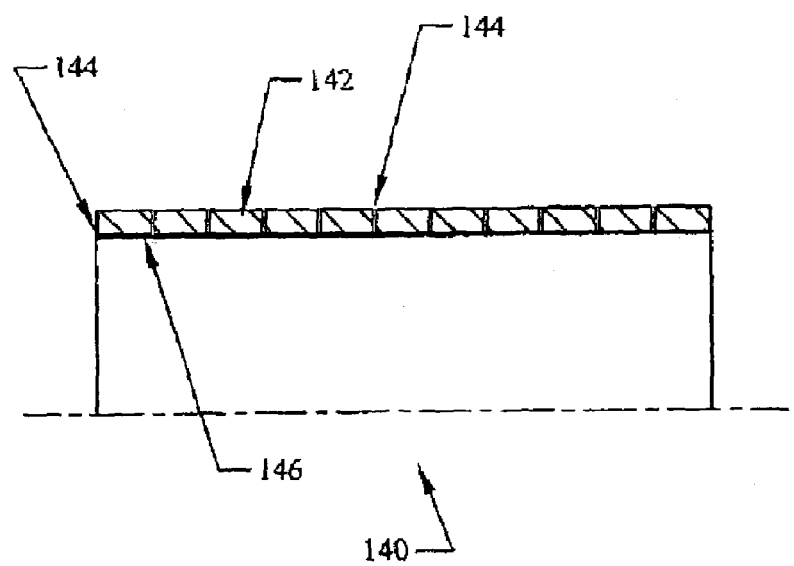
FIG. 2 illustrates a cross-sectional view of one embodiment of a magnetic flux tube.

FIG. 2 illustrates a magnetic flux tube 140 having a plurality of ribbon coil segments 142. The plurality of ribbon coil segments 142 are bound together, and separated from each other by a plurality of insulation separators 144. The plurality of ribbon coil segments 142 and the insulation separators 144 form a generally cylindrical shape and make up the magnetic flux tube 140. In addition, the inside cylinder of the ribbon coil segments 142 and the outside surface of the insulation tube 146 are bonded together to further form the magnetic flux tube 140.

Any type of conventional rotor will work with the present invention. FIG. 3A illustrates one type of rotor for use with the embodiment of the simulated slot motor described herein. Preferably, the rotor is a permanent magnet rotor. The rotor 120 includes a shaft 121 and a plurality of permanent magnets 122. The permanent magnets 122 can be made of any magnetic material. The stronger the magnetic material, the more torque that will be produced. The permanent magnets 122 are affixed to the shaft, such that the magnets 122 form a plurality of polar segmented arc ring sectors 302. Preferably, the rotor 120 is over-molded to protect the rotor 120 and further secure the permanent magnets to the rotor shaft 121. The rotor 120 may be over-molded with any known material, such as an epoxy, or a liquid crystal, preferably liquid crystal, Vectra A-530.

The polar segmented arc ring sectors 302 alternate in polarity having a north pole adjacent to a south pole. In one embodiment, the rotor 120 has four (4) polar segmented arc ring sectors 302A, 302B, 302C and 302D, two having a north polarity, and two having a south polarity. FIG. 3B illustrates a stator 130 having a magnetic flux tube 140 retaining a plurality of field windings. The plurality of field windings illustrated in FIG. 3B depicts one phase winding 310, for example phase 2 of a three phase motor. The remaining phases, phase 1 and phase 3 (not shown), are similarly situated within the magnetic flux tube 140, such that a (+) phase alternates with a (−) phase.

FIG. 3C illustrates a cross-sectional view of a simulated slot electric motor 100 having a housing 102, the rotor 120 described above in relation to FIGS. 1 and 2, and the stator 130, described above in relation to FIG. 3B. An insulation layer 108 separates the housing 102 from the stator 130. The stator 130 is secured to the housing 102 via the insulation layer 108. It should be obvious that insulation layer 108 can be eliminated if the motor housing 102 is formed with a non-electrically conductive material, such as, for example, plastic. As discussed above, the stator 130 includes the magnetic flux tube 140 and a plurality of multi-phase field windings 132. The magnetic flux tube 140 has an inner insulation layer 146 that insulates the magnetic flux tube 140 from the plurality of field windings 132. Preferably, the field windings 132 are positioned inside of the stator 130 and are over-molded to the stator 130. Over-molding the field windings 132 to the stator 130 secures the field windings 132 in place and, in addition, protects the field windings 132 from the environment. Alternatively, the field windings 132 can be secured to the stator 130 at each end so that the field windings 132 are in tension across the stator 130. The tension in the field windings 132 holds the field windings 132 in place.

The plurality of field windings 132 are at least partially retained within the simulated slot 134 and molded to the internal cylinder wall of the magnetic flux tube 140. The field windings 132 are formed within a plurality of segmented arc ring sectors in a general loop configuration such that current flowing in one direction (through the stator 130) within the field windings 132 creates a positive force and current flowing in the other direction through the field windings create a negative force. This is denoted by, for example, +Ø1 for the portion of the phase one winding wherein the current is flowing in a first direction, and −Ø1 for the portion of the phase one winding wherein the current is flowing in the opposite direction. In one embodiment, a three phase simulated slot electric motor has two sets of windings per phase forming two +Ø and two −Ø for each of the three phases.

As described above, the permanent magnet rotor 120 includes a shaft 121 and a plurality of magnets 122. The plurality of magnets 122, define a plurality of polar arc ring sectors 302A, 302B, 302C and 302D. The polar arcs sectors 302A, 302B, 302C and 302D extend outwardly from the center. Each polar arc ring sector 302A, 302B, 302C and 302D encompasses a plurality of field windings 132. For example, polar arc ring sector 302A encompasses +Ø1 310, −Ø2 314, and +Ø3 318. Likewise, polar arc ring sector 302B encompasses −Ø1 312, +Ø2 316, and −Ø3 320. Similarly, polar arc ring sector 302C encompasses +Ø1 310, −Ø2 314, and +Ø3 318, and finally, polar arc ring sector 302D encompasses −Ø1 312, +Ø2 316, and −Ø3 320. The windings are arranged so that a positive phase, +Ø, is adjacent to a negative phase, −Ø within the inside diameter of, and following the gereratrix of, the magnetic flux tube 140. The plurality of field windings 132 are over molded within simulated slots 134 and bonded to the stator 130, which eliminates the need to have the field windings embedded within slots as with conventional motors. The field windings 132 can be stacked on one another to add additional windings and increase the amount of torque produced by the motor 100. In addition, the gap 330 between the permanent magnets 122 and the plurality of field windings 132 can be a large gap, or a small gap, depending on the desired characteristics for the motor.

Figure 4A:
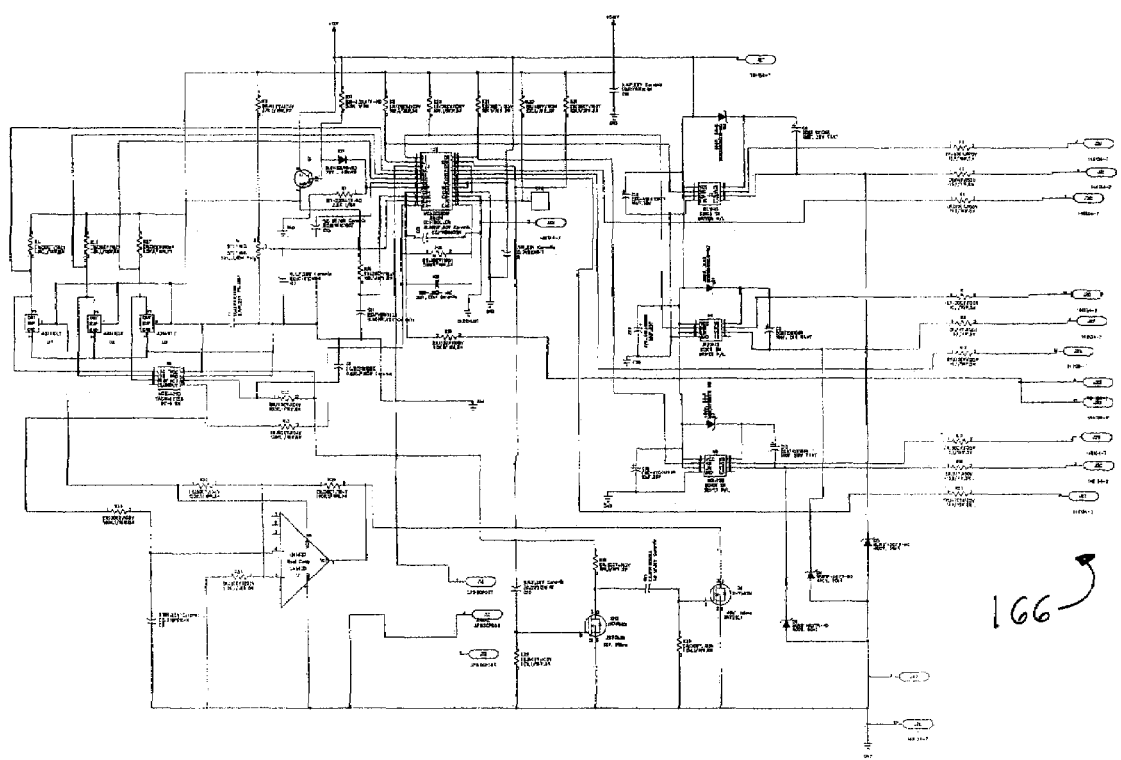
FIG. 4A illustrates a control package for one embodiment of the electric motor illustrated in FIG. 1.
Figure 4B:
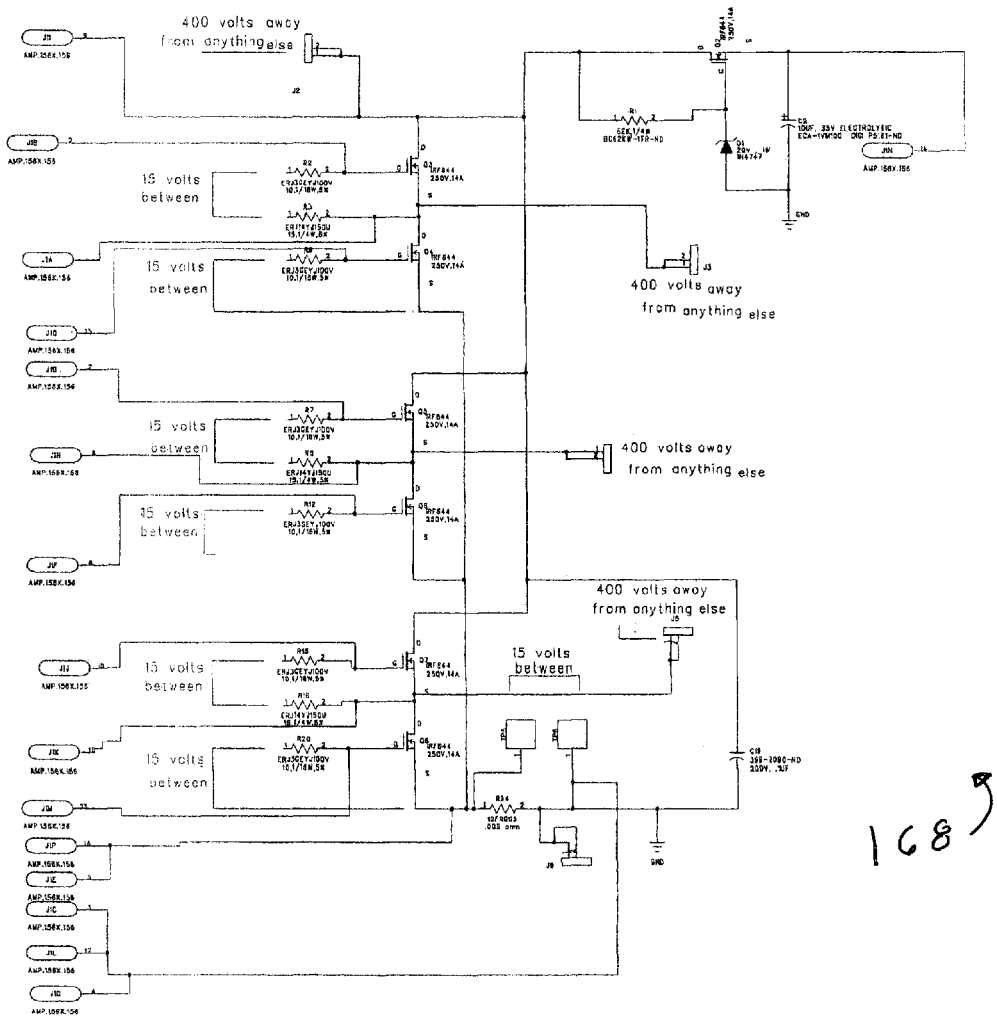
FIG. 4B illustrates a power package for one embodiment of the electric motor illustrated in FIG. 1.
Figure 4C:
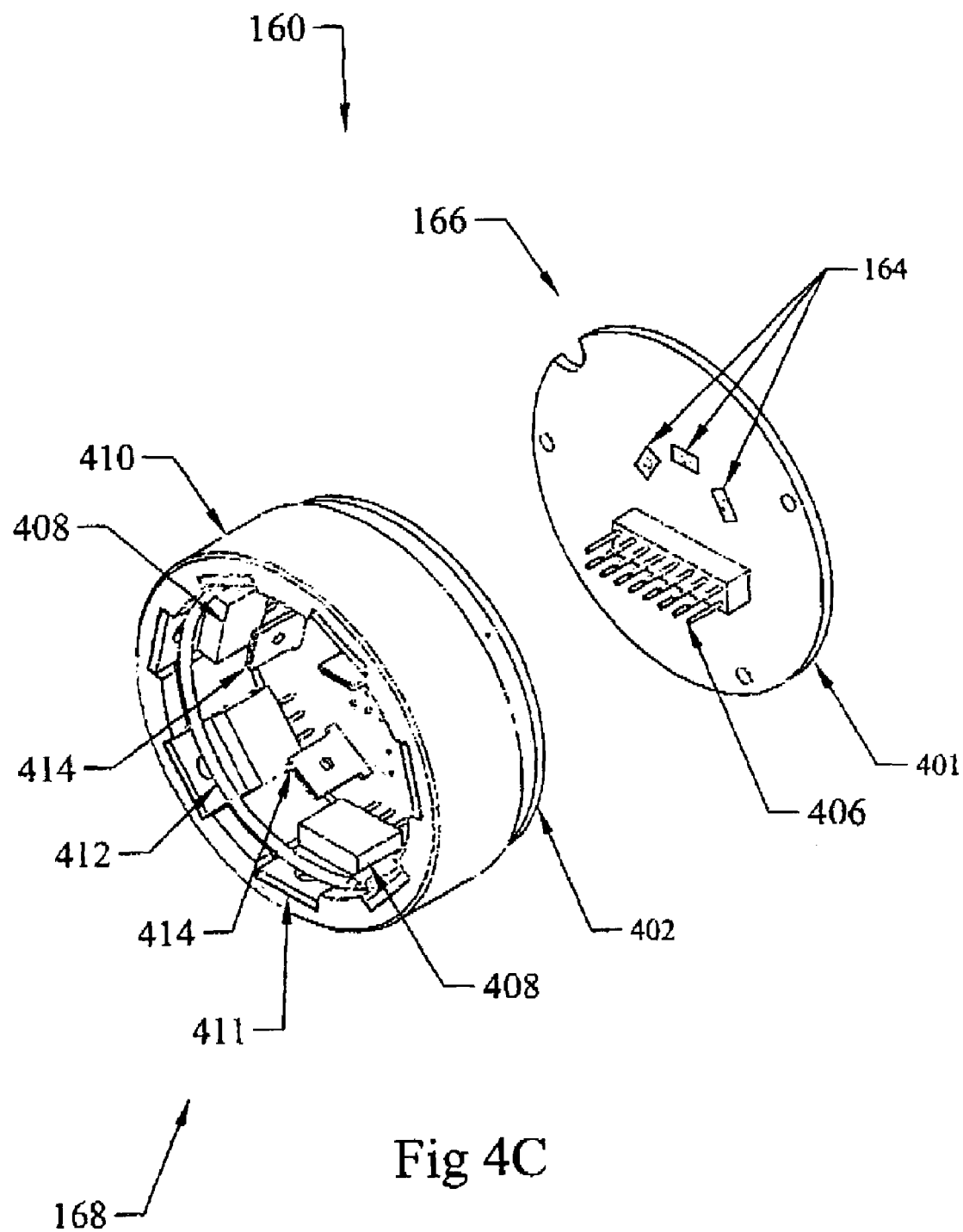
FIG. 4C illustrates a modular motor control package for one embodiment of the electric motor illustrated in FIG. 1.

FIG. 4A illustrates one embodiment of a commutation control package 166 for use with one embodiment of the motor 100 described herein. FIG. 4B illustrates one embodiment of a power package 168 for use with one embodiment of the motor 100 described herein. The simulated slot electric motor 100 can be controlled by a variety of motor control packages and circuitry commonly known. FIG. 4C provides a novel arrangement and layout for an electronic modular control package 160 for use with the simulated slot motor 100. Preferably, the electronic modular control package 160 includes two components, a modular commutation control package 166 and a modular power package 168. The modular commutation control package 166 and modular power package 168 are modular components. The components are separate components and that are flexible and interchangeable, as a result they can be mixed and matched and have plug and play characteristics. The modular commutation control package 166 can contain a vast array of control circuits. The control circuits can include dynamic braking circuitry, reversing circuitry, fixed speed circuitry, fixed variable speed circuitry, or other known motor control circuitry. The modular commutation control package can include any control circuit or any combination of control circuits and any conventional control circuit has bee contemplated and is within the spirit and scope of the present invention. Different standard modular control packages can be specially created for special applications, or the modular control packages can be standard off the shelf control packages supplied with the motor. In addition, if the application changes, the user need only purchase a different modular control package and plug it into the modular power supply.

The modular commutation control package 166 preferably determines the position of the rotor 120 within the stator 130 using a ring magnet 124 affixed to one end of the rotor shaft 121. As the rotor shaft 121 rotates the north and south poles of the ring magnet 124 rotate within close distance of the proximity switches 164. Preferably, the proximity switches 164 are hall effect sensors and are preferably mounted on the commutation control printed circuit board 401. As the ring magnet 124 rotates its magnetic poles pass by the proximity switches 164. Each proximity switch opens/closes providing a signal to the commutation circuit 166 indicating the position of the rotor 121 based on the position of the magnetic poles on the ring magnet 124. Opening and closing of the proximity switches 164 directs a power current pulse the appropriate field winding 132. Other means of detecting the position of the rotor, such as fiber optic switching to provide a signal to the commutation circuit have been contemplated and are within the spirit and scope of the present invention.

Preferably the modular commutation control package 166 is mounted on a printed circuit board and includes a male plug 406 that plugs into a female receptacle (not shown) on the modular power package 168. Preferably the male plug 406 is a pin connector, and still more preferably is a 16 pin connector. Preferably, plug 406 provides all of the required electrical connections between the modular power package 168 and the modular commutation control package 166. In one embodiment the plug 406 provides the support and mounting for the modular commutation control package 166, thus to replace the commutation control package 166 with a new commutation control package, a user simply unplugs the old commutation control package and plugs in the new commutation control package. In addition, in one embodiment, the commutation control package 166 is mounted on a circularly shaped circuit board 401. The shape of the circuit board allows the commutation circuit 166 to fit within the cylindrical inside diameter of the motor housing 102. This allows the printed circuit board to be protected and secured to the motor 100.

The modular power package 168 is also a modular component. A variety of modular power packages 168 can be created. The modular power package 168 can be configured to run the motor from a direct current (D.C.) power source, or an alternating current (A.C.) power source. In addition, the modular power package 168 can be configured to operate on different voltages, such as 120 volts, 220 volts, 36 volts, etc. The modular power package 168 includes a printed circuit board 402. The printed circuit board 402 includes a plurality of electrical connections 414 for connecting to a power supply, and for connecting input to the motor control circuit. The modular power package 168 contains a receptacle for receiving the plug from the modular commutation package 166. In addition, the printed circuit board contains a plurality of transistors 408, preferably mos fet transistors. Conventionally, the transistors are mounted on a square or rectangular printed circuit board, and are generally mounted coplanar to each other. Preferably, however, the printed circuit board 402 is circular shape and the transistors 408 are generally mounted in a polygonal shape. As with the printed circuit board 401, the circular shape enables the power printed circuit board 402 to fit within the motor housing 102. Mounting the transistors 408 in a polygonal shape saves room on the printed circuit board and allows the size of the board and to be reduced. In addition, modular power control circuit 168 includes a thermally conductive ring 410. Preferably, the thermally conductive ring 410 is made of aluminum. The thermally conductive ring 410 has a plurality of slots configured to receive the plurality of transistors 408. The thermally conductive ring 410 acts as a heat sink and removes heat from the transistors 408. Preferably, the transistors 408 are over-molded to the thermally conductive ring 410. Over-molding the transistors 408 to the thermally conductive ring 410 secures the power printed circuit board 402 to the thermally conductive ring 410. Alternatively, a snap ring 412 can be inserted on the inside of the thermally conductive ring 410 to hold the transistors 408 firmly in place. Preferably, the transistors 408 are electrically isolated from one another.

In one embodiment, the thermally conductive ring 410 fits snugly inside of the housing 102. As noted earlier, preferably the motor housing 102 is made of aluminum and has fins for aiding in the dissipation of heat. The snug fit between the thermally conductive ring 410 and the housing 102 allows heat to be conducted away from the transistors 408 through the thermally conductive ring 410 to the housing 102 and to the atmosphere. The snug fit of the conductive ring 410 to the housing firmly holds the modular power package 168 in place, which in turns firmly holds the commutation control package 166 in place. Alternatively thermally conductive ring 410 can be bonded to the housing 102 with a thermal conductive structural adhesive. Still yet, the thermally conductive ring 410 can also be over-molded to the housing 102 with thermal conductive epoxies, thermal conductive liquid crystals or thermal conductive polymers.

In yet another embodiment, the motor control package 160 has its own electronics housing 104. The electronics housing 104 is made of the same material as the motor housing 102, and preferably is made of aluminum and has fins for aiding in the dissipation of heat. The electronics housing 104 can be affixed to the motor housing using any known method, such as plurality of bolts, a crimp connection, over-molding, epoxy etc. In this embodiment the thermally conductive ring 410 is affixed to the electronics housing 104 similarly to methods described above.

The modular components are interchangeable and can be combined to obtain the desired control package for controlling the motor and the desired power package for powering the motor. Preferably, the modules have a plug and play configuration so that the commutation control modules can be interchanged and the motor run without the need for modifications of the modular power package or the modular commutation control package. Therefore if a motor is in use having a single speed, non-reversing modular commutation control package, and the user desires a variable speed, reversing motor, the user simply unplugs the original modular commutation control package and plugs in the new modular commutation control package that has the desired control characteristics. The modular power package have a plug and play configuration as well. If the original motor was operating at 220 volts and the user now desired to run the motor at 120 volts, the user simply unplugs the 220 volt modular power control package 168 and plugs in the 120 volt modular power control package.

Furthermore, the interchangeable modular control packages reduces costs and allows a user to quickly trouble shoot problems with the motor. Rather than change out the power and control board, as is required with conventional controllers, the user can change out the modular power package or modular control package based on which one is the problem. Since the costs of the power and control boards can be significant, the modular components with the ability to replace only one component of the control package reduce maintenance costs. In addition, the modular packages allow a user to stock one type of motor for spare parts and mix and match control packages to fit the desired applications.

Current flowing through the windings in one direction, such as for example through +Ø1 310, creates a positive magnetic field which repels magnets having a north pole and attracts magnets having a south pole. The rotor shaft 121 is retained in the motor housing 102 by rotor bearings 110. The rotor bearings 110 allow the rotor shaft 121 to rotate. The force on the rotor 120 created by the repelling and attracting forces between the magnetic fields of the permanent magnets 122 and the plurality of field windings 132 cause the rotor 120 to rotate, or produce torque. The strength of the magnetic field determines the torque, or force produced by the motor. The strength of the magnetic field can be increased or decreased by: increasing/decreasing the number of field windings, increasing/decreasing the current flow through the field windings, and or increasing/decreasing the size or strength of the permanent magnets.

A revolving magnetic field is produced by the rotation of the permanent magnet rotor. The revolving magnetic field is affected by losses generated by eddy currents and hysteresis flows. The higher the eddy currents and Hysteresis losses, the less efficient the motors. Reducing the eddy current losses to a minimum within the magnetic flux tube 140 and reducing the Hysteresis losses to a minimum within the simulated slots 134 improves motor power torque and efficiency. The magnetic flux tube 140 described herein allows for an optimal cross-sectional area for the eddy current path. An optimum configuration for reducing eddy current loss is obtained by wrapping thin narrow strips of conductive material, such as 3% silicon electric steel, having a cross-sectional area of $\frac{1}{1000}$ of a square inch to form the ribbon coil segments 142. In addition, forming the field windings within a simulated slot 134 without the use of conventional slots within the stator greatly reduces Hysteresis losses that are attributed to conventional slots within the magnetic field return laminations within conventional motors.

Figure 5A:
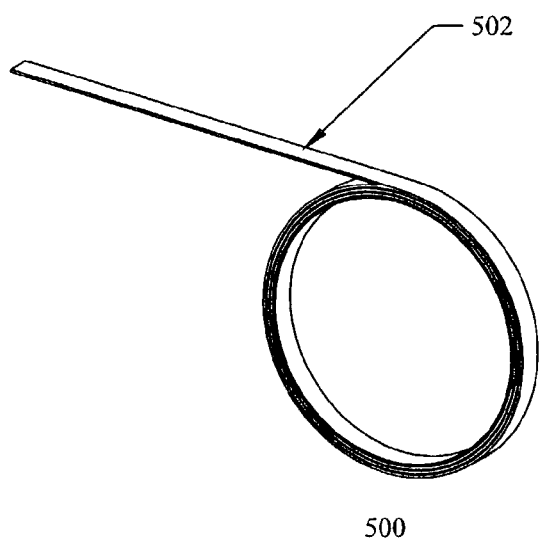
FIG. 5A illustrates a ribbon coil segment of one embodiment of a magnetic flux tube.
Figure 5B:
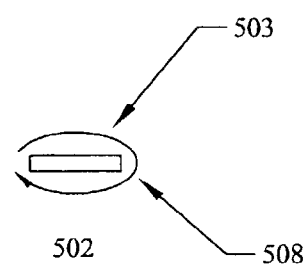
FIG. 5B illustrates a cross-sectional view of one embodiment of a single strip of conductive material used to form a ribbon coil segment for use in a magnetic flux tube.
Figure 5C:
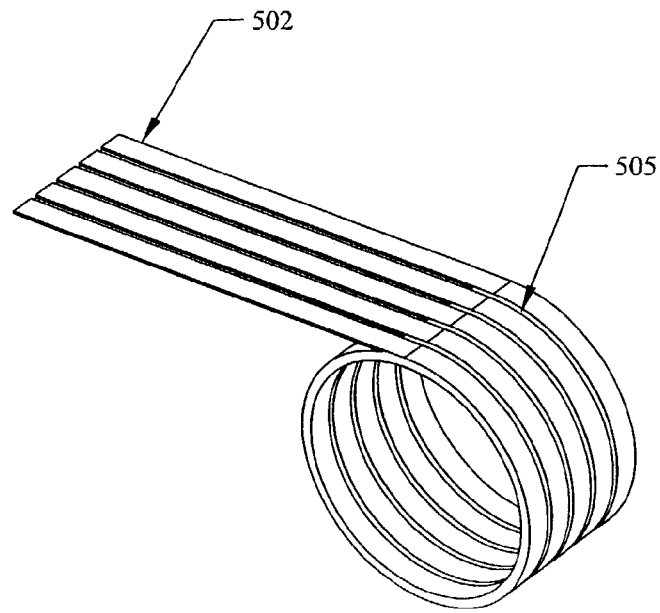
FIG. 5C illustrates multiple ribbon coil segments joined together in one embodiment of a magnetic flux tube.

FIGS. 5A, 5B and 5C illustrate one method of forming a magnetic flux tube. A ribbon coil segment 500 is formed by wrapping a thin strip of conductive material 502, preferably 3% silicon electric steel, in a cylindrical shape. Preferably, the thin strip of conductive material 502 has an optimal cross sectional area of $\frac{1}{1000}$ of a square inch (FIG. 5 B). Eddy currents 508 form around the cross section of the conductive material 502. Utilizing a cross sectional area of $\frac{1}{1000}$ of a square inch has been found to decreases eddy current losses and increases efficiency. FIG. 5C illustrates a plurality of ribbon coil segments 500 that are bound together by, and simultaneously electrically separated from each other by, an insulation separator 505, forming a magnetic flux tube 510.

Figure 6:
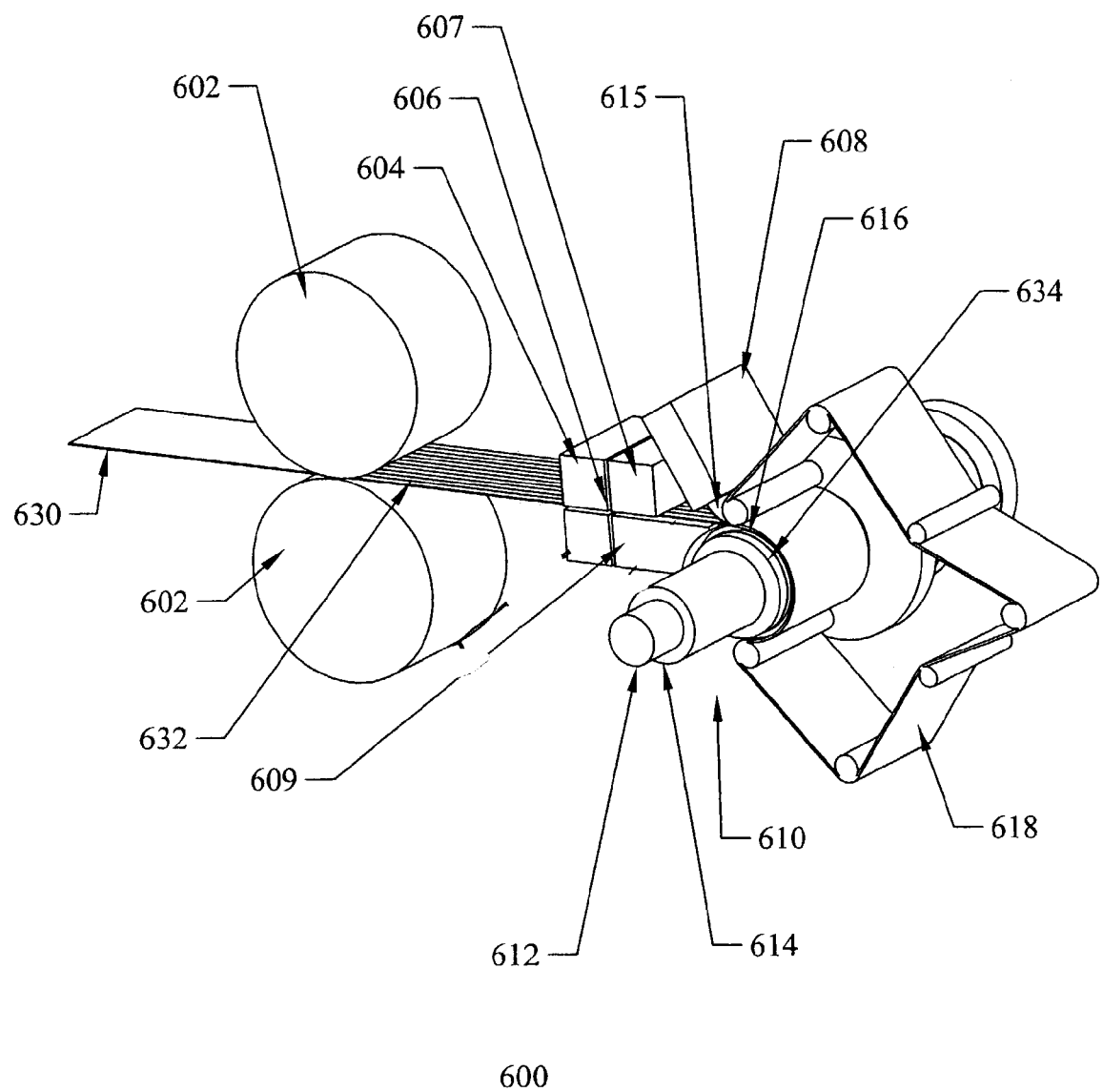
FIG. 6 illustrates one embodiment of a device for use in manufacturing a magnetic flux tube.

FIG. 6 illustrates one embodiment of a device 600 for forming a magnetic flux tube. The device 600 includes a set of slitting knives 602, a set of guide clamps 604, 607, a set of cut off knives 606, an insulation separation applicator 609, a taper 608, a mandrel 610 and an adjustable wrap guide belt 618. Preferably, the mandrel 610 is an expandable mandrel and includes a spindle shaft 612, an expanding tool 614 and an expandable collet 616.

Preferably, a magnetic flux tube is fabricated with the device 600 illustrated in FIG. 6 utilizing the following method. An insulation tube 634 is inserted over the collet 616. Preferably the collet 616 is an expandable collet 616 which is fixed in place over the expanding mandrel spindle shaft 612. The expanding tool 614 is energized, which expands expandable collet 616. The expandable collet 616 expands to engage the insulation tube 634 firmly in place. An adjustable wrap guide belt 618 moves in and forms a cylindrical guide around the expanded insulation tube 634. A thin sheet of conductive material 630, preferably 3% silicon electric steel, is feed through the set of slitting knives 602. The thin sheet of conductive material 630 is slit into a plurality of thin narrow strips 632. The plurality of thin narrow strips 632 are fed though a set of guide clamps 604, 607 and a set of cut off knives 606. The cut off knives 606 cut the thin narrow strips 632 at the trailing edge to a desired length. An insulation applicator 609 feeds the insulation 611 to the inner layers and inner edges of the thin narrow strips 632. The thin narrow strips 632 and insulation are feed onto the insulation tube 634. The insulation 611 adheres to and is compressed between the layers and edges of the thin narrow strips 632 as they are feed onto the insulation tube 634. The adjustable wrap guide belt 618 guides the thin narrow strips 632 and the insulation around the insulation tube. The adjustable wrap guide belt 618 expands to the outside diameter of the wrapped thin narrow strips 632 and holds the strips 632 firmly in place. The taper 608 applies an insulation tape 615 to the trailing edge of the thin narrow strips 632. The trailing edge of the thin narrow strips 632 and insulation tape 615 are wound around the insulation tube 634. The thin narrow strips 632 are bound together with each other and to the insulation tube with the insulation tape 615. The insulation 611 layer electrically isolates the thin strips 632 from one another and simultaneously bonds the thin narrow strips 632 together. Adjustable wrap guide belt 618 is pulled back from the expanding mandrel spindle shaft 612. The expanding tool 614 is de-energized and the expandable collet 616 contracts allowing the newly formed magnetic flux tube to be removed from the mandrel spindle shaft 612.

Figure 7A:
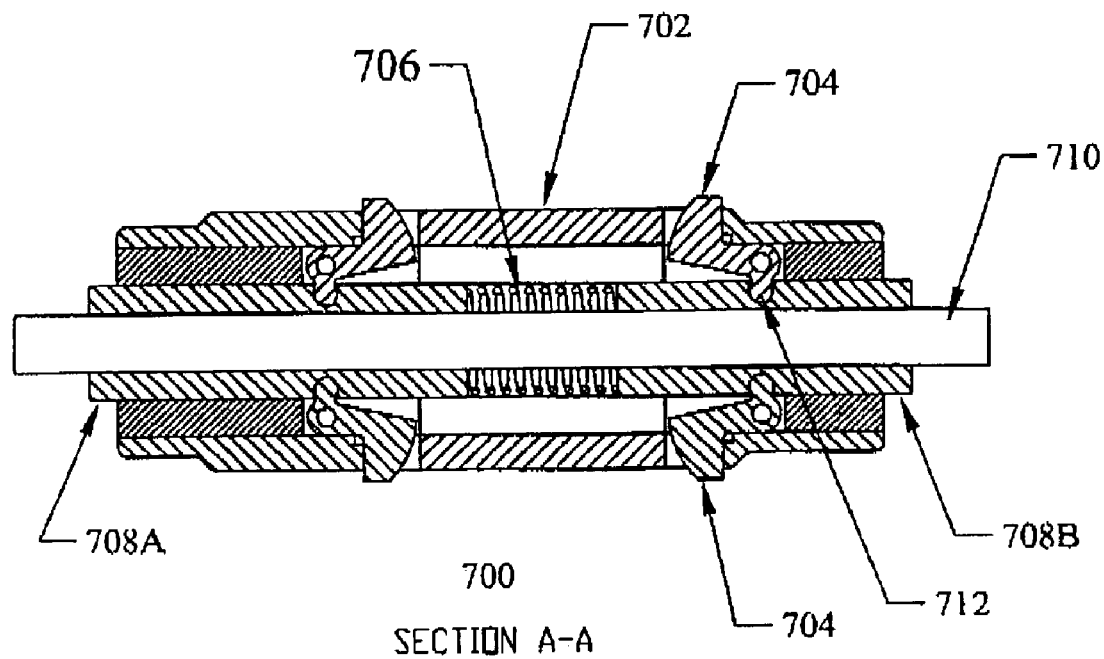
FIGS. 7A and 7B illustrates one embodiment of a winding tool for use in manufacturing a simulated slot winding shown schematically.

The field windings formed within the simulated slots, discussed above, can be fabricated with a winding tool. One embodiment of a winding tool 700 provides a cylindrical body 702 having a plurality of retractable blades 704. FIG. 7A is a cross-sectional view of such a winding tool 700. The winding tool includes an inner shaft 710, two slip collars 708A, 708B, and a spring 706 located over the inner shaft 710 and disposed between slip collars 708A, 708B. The slip collars 708A, 708B slide along the inner shaft 710. The spring 706 biases the slip collars 708A and 708B outwardly from the center along the generatrix of the winding tool 700. The retractable blades 704 are pivotally connected to the cylindrical body 702. An extension tab 712 on the retractable blades 704 is retained within a radial groove on the slip collars 708A and 708B, such that when the slip collars 708A and 708B are forced inward along the generatrix the center of the winding tool 700 the extension tabs 712 force the retractable blades 704 to protrude out from the outer surface of the cylindrical body 702 forming a simulated slot 720 (FIG. 7A). When the slip collars 708A and 708B are forced outward along the generatrix of the winding tool 700 the tabs 712 force the retractable blades 704 to retract below the outer surface, of the cylindrical body 702.

Figure 7B:
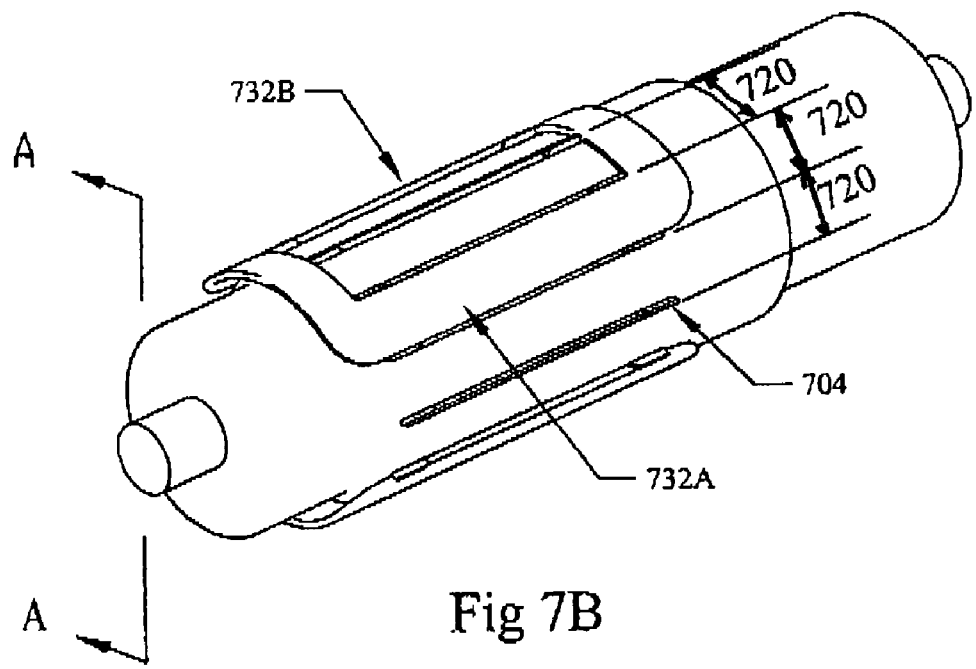

FIG. 7 B illustrates using one embodiment of a winding tool 700 to form a simulated slot field winding 732. The slip collars 708A and 708B are compressed so that the retractable blades 704 protrude from the cylindrical body 702. The retractable blades 704 form simulated slot 720 as in a conventional slotted motor. Similar to the example illustrated in FIG. 3C, one embodiment of the winding tool 700 has 12 simulated slots 720. The 12 simulated slots 720 allow for two of each of the plurality of phases, such as two +Ø1 and −Ø1, two +Ø2 and −Ø2, and two +Ø3 and −Ø3 windings. The field winding 732 is wrapped around a plurality of retractable blades 704. In FIG. 7B the field winding 732 illustrates a single phase of a three phase winding. The wire, making up field winding 732 is wrapped around four of the retractable blades 704 filling the simulated slot 720 with wire and leaving two simulated slots 720 between the phase 1 winding. These two simulated slots provide room for two other portions of phase windings such as a −Ø2 and a +Ø3. The wire 732A in the first slot is configured to carry electrical current in a first direction, this portion of the winding 732A forms, for example +Ø1. The other portion of the field winding 732B is configured to carry current in the opposite direction, forming, for example, −Ø1. Upon completing the field windings 732, the slip collars 708A and 708B forced outward along the generatrix of the cylindrical body 702, which intern retracts the retractable blades 704 below the surface of the cylindrical body 702. The field winding 732 can be easily removed from the winding tool 700.

Figure 7C:
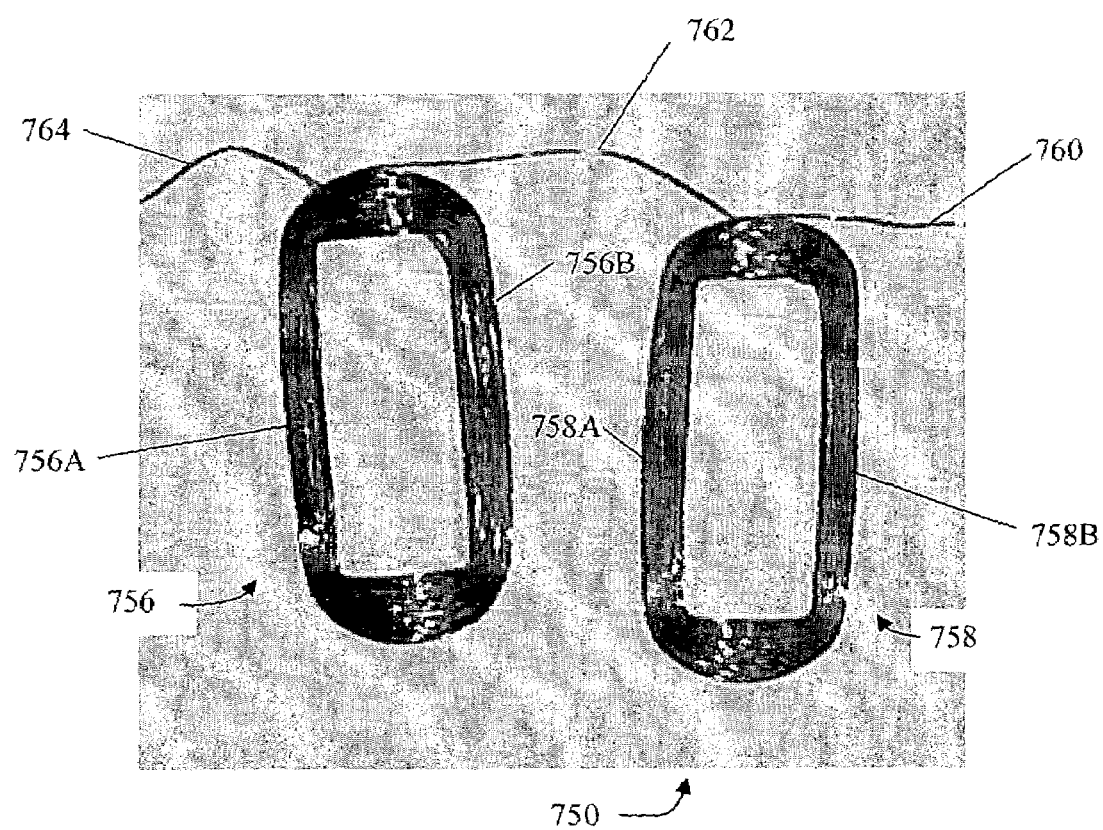
FIG. 7C illustrates one embodiment of a simulated slot winding formed with the embodiment of the winding tool illustrated in FIGS. 7A and 7B.
Figure 8:
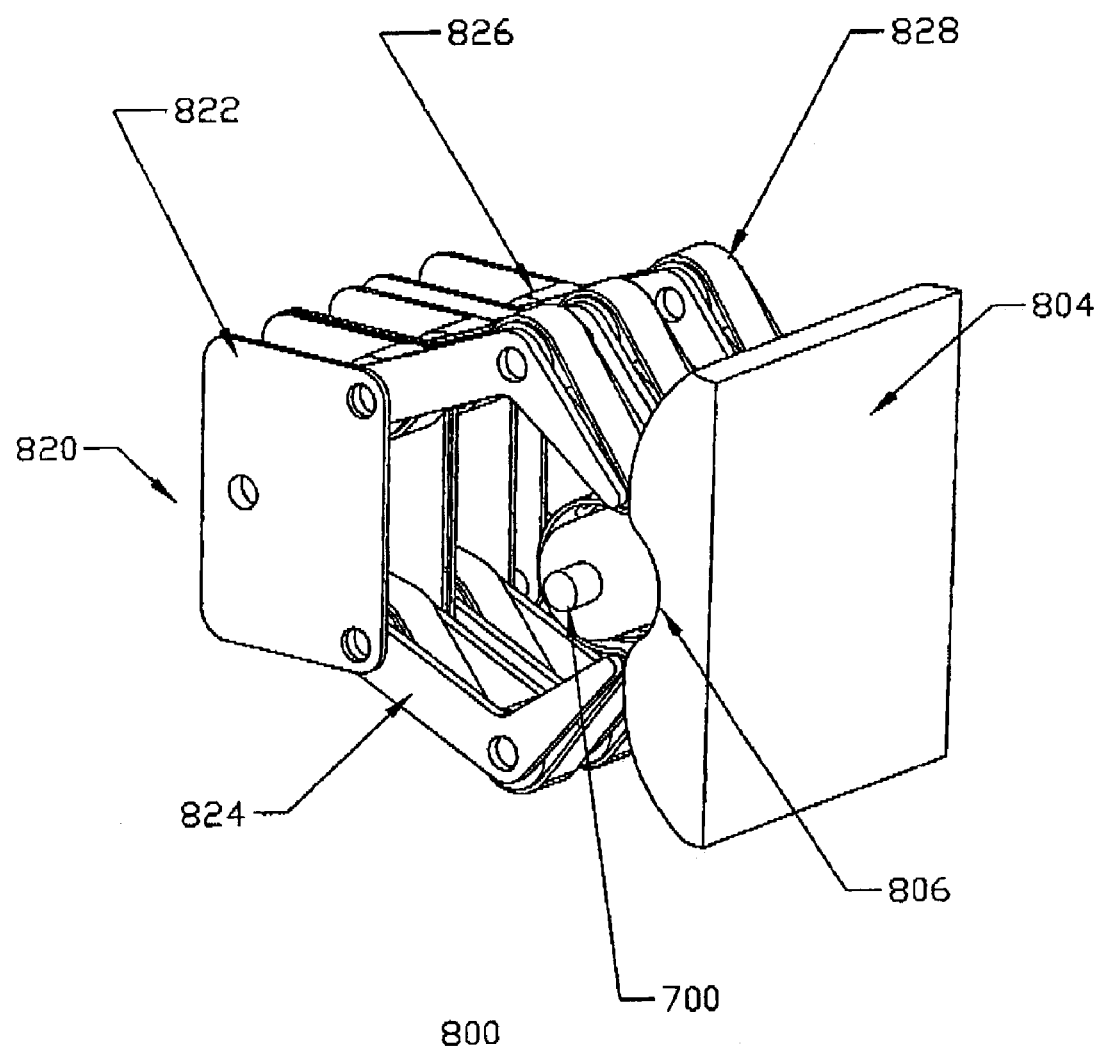
FIG. 8 illustrates one embodiment of another device for use in manufacturing a simulated slot winding for use in the present invention.

FIG. 7C illustrates one embodiment of a simulated slot winding 750 formed with the embodiment of the winding tool 700 illustrated in FIGS. 7A and 7B. The simulated slot winding 750 is, for example, two Ø1 windings for a multi-phase motor. The embodiment illustrates two Ø1 windings 756 and 758. The two Ø1 windings 756 and 758 are to be located 180° apart when placed in the stator. Each Ø1 winding 756 and 758 includes a +Ø1 winding 756A, and 758A, and a −Ø1 winding 756B and 758B. The positive and negative windings are designated as such based on the direction of current flowing though the windings when the field windings 756 and 758 are in use. In one embodiment, the simulated slot winding 750 is made of magnetic wire. The wire is wrapped around the retractable blades 704 as described above forming a generally oval shape Ø1 winding 756 (and 758). The wire is grouped forming 756A, 756B, 758A, and 758B which are contained in simulated slots. The wire is wrapped around the retractable blades 704 forming the first Ø1 winding 756 until the desired number of wires are in each simulated slot forming +Ø1 756A in a first simulated slot and −Ø1 756B in a second simulated slot. The winding tool 700 is rotated 180° and the wire is wrapped around a second group of retractable blades 704 forming the second Ø1 winding 758. Again the wire is wrapped around the retractable blades 704 until the desired number of wires are in each simulated slot forming +Ø1 758A, and −Ø1 758B. The two Ø1 windings 756 and 758 are joined by the wire 762. The first end 764 of the wire is connected to the control circuit board 401 (FIG. 4), and the second end 760 can be connected to the Ø2 and/or Ø3 windings depending on whether a wye or delta configuration is desired.

In another embodiment 800, the winding tool 700 is used in conjunction with a wire guide 804 and a retention device 820 or containment guide. The wire feeder 804 includes a recessed portion 806 for receiving the winding tool 700 and forming the outside area of the simulated slot 720. The winding tool 700 is free to rotate within the recessed portion 806 of the wire guide 804. The wire guide 804 controls the feed location of the wire used to form the field winding element. In addition the recessed area 806 provides a form to contain the field windings on the wining tool 700. In one embodiment, a spool winder (not shown) is used to wind wire around the retractable blades 704 of the winding tool 700. The spool winder rotates about the wire guide 804, which guides the wire onto the winding tool 700. When the desired number of wires are wound around the retractable blades 704, the winding tool is rotated allowing the spool winder to wind the next phase around the winding tool 700.

In addition, further aid in containing the field windings on the winding tool 700 is provided by a retention device 802 or containment guide. In one embodiment, the retention device 820 includes a plurality of plates 822 connected to a plurality of adjustable arms 824. A plurality of rollers 826 are supported by the plates 822 and the adjustable arms 824. The plurality of rollers 826 are aligned to support a plurality of retention belts 828. The retention belts 828 are held firmly against the winding tool 700 by the plurality of arms 824. The retention belts 828 freely rotate around the rollers supported by the adjustable arms 824 and the plates 822 allowing the winding tool 700 to rotate. As the winding tool 700 is rotated about its own axis to the next phase position the retention belts contain the formed field windings 732 within the simulated slot 720. When all field winding phases are complete the retention device 820 and wire feeder 804 retract away from the winding tool 700 and the retractable blades 704 retract below the surface of the body 702 away formed field winding allowing the field winding to be removed from the winding tool 700.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the magnetic flux tube could be used in conjunction with other variations of field windings and decrease losses due to eddy currents. Further the field winding can be used with other modified stator designs and still reduce losses due to Hysteresis. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. An electric motor comprising:
   a housing,
   a rotor,
   a stator having,
     a magnetic flux tube,
     a plurality of field windings at least partially disposed in a plurality of slots, and
     a plurality of electrical connections connected to the plurality of field windings configured to connect to a motor control package,
   wherein the plurality of field windings are at least partially retained within the inside diameter of the magnetic flux tube, and
   the motor control package comprises:
     a commutation control package connected to,
     a power supply package, having
       a thermally conductive housing,
     wherein the power supply package is secured to the thermal conductive housing configured to conduct heat away from the power supply circuit.

2. The electric motor of claim 1 wherein the power supply package comprises:
   a printed circuit board,
   one or more transistors, and
   a receptacle,
   wherein the transistors are mounted to the printed circuit board in a vertical position and the transistors are secured to the thermal conductive housing, and
   wherein the receptacle is configured to connect to the commutation control package.

3. The electric motor of claim 1 wherein the motor control circuit comprises:
   a modular power supply package, and
   a modular commutation control package,
   wherein the modular power supply circuit is configured to connect with the modular commutation circuit placing the modular power supply circuit and the modular communication control circuit in electrical communications.

4. The electric motor of claim 3 wherein the modular power supply package is configured to mate with a plurality of modular commutation control package.

5. The electric motor of claim 4 wherein the plurality of modular commutation control package comprises at least one selected from a variable speed control circuit, a fixed speed circuit, a reversing circuit, a dynamic braking circuit and a fixed variable speed circuit.

6. The electric motor of claim 3 wherein said modular commutation package is configured to mate with a plurality of modular power supply package.

7. The electric motor of claim 6 wherein the plurality of modular power supply package is at least one of the following; an AC power supply, a DC power supply, a 220 volt power supply, a 120 volt power supply and/or a 36 volt power supply.

8. A simulated slot electric motor comprising:
   a housing,
   a rotor,
   a stator having,
     a magnetic flux tube,
     a plurality of field windings at least partially disposed in a plurality of simulated slots, and
     a plurality of electrical connections connected to the plurality of field windings configured to connect to a motor control package,
   wherein the plurality of field windings are at least partially retained within the inside diameter of the magnetic flux tube, wherein the plurality of field windings are connected in one selected from a wye and a delta configuration, and
   wherein the plurality of field windings form a generally segmented arc ring sector cylindrical shape.

* * * * *